US009863371B2

(12) United States Patent
El Gammal et al.

(10) Patent No.: US 9,863,371 B2
(45) Date of Patent: Jan. 9, 2018

(54) GASEOUS FUEL, EGR AND AIR MIXING DEVICE AND INSERT

(71) Applicant: Robert Bosch GmbH, Stuttgart (DE)

(72) Inventors: Mohamed Moustafa El Gammal, Windsor (CA); Mark Vincent Casarella, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 14/840,858

(22) Filed: Aug. 31, 2015

(65) Prior Publication Data

US 2017/0058839 A1 Mar. 2, 2017

(51) Int. Cl.
| | |
|---|---|
| F02M 21/04 | (2006.01) |
| F02M 35/10 | (2006.01) |
| F02D 19/02 | (2006.01) |
| F02M 21/02 | (2006.01) |
| F02B 43/10 | (2006.01) |

(52) U.S. Cl.
CPC ...... F02M 21/04 (2013.01); F02M 35/10222 (2013.01); *F02B 43/10* (2013.01); *F02D 19/02* (2013.01); *F02M 21/02* (2013.01); *F02M 21/042* (2013.01); *Y02T 10/32* (2013.01)

(58) Field of Classification Search
CPC ...... F02M 21/02; F02M 21/04; F02M 21/042; F02B 43/10; F02D 19/02
USPC ....................................................... 123/527
See application file for complete search history.

(56) References Cited

U.S. PATENT DOCUMENTS

| | | |
|---|---|---|
| 3,693,329 A | 9/1972 | Willis |
| 4,073,832 A | 2/1978 | McGann |
| 4,991,561 A | 2/1991 | Gerassimov et al. |
| 5,408,978 A | 4/1995 | Davis |
| 5,522,368 A | 6/1996 | Tusino |
| 5,832,905 A | 11/1998 | King et al. |
| 5,887,574 A | 3/1999 | Smith |
| 5,908,475 A | 6/1999 | Morris, Jr. et al. |

(Continued)

FOREIGN PATENT DOCUMENTS

| | | | | |
|---|---|---|---|---|
| DE | 4137573 A1 | * | 5/1993 | ............ B01F 5/0415 |
| JP | 2009052520 A | * | 3/2009 | |

OTHER PUBLICATIONS

El-Gammal et al., "Three-dimensional wake dynamics of a blunt and divergent trailing edge airfoil," Exp Fluids (2008) 44:705-717.

*Primary Examiner* — Jacob Amick
*Assistant Examiner* — Charles Brauch
(74) *Attorney, Agent, or Firm* — Michael Best & Friedrich LLP (57) ABSTRACT

An insert for engine intake gaseous fuel mixing device. A body defines a longitudinal axis, leading end, trailing end, and exterior surface profile from the leading to the trailing end. Supports extend radially from the body, each support extending parallel to the axis to define separate longitudinal intake passages. The exterior surface profile of the body includes a nose section in which diameter increases from a minimum value at the leading end to a maximum value at a downstream end of the nose section. The nose section is followed by a flat section and a curved tapering section in which the profile converges toward the axis at an increasing rate from the flat section in a direction of the axis toward the trailing end. The diameter at the trailing end is at least 15 percent less than a maximum diameter of the body.

19 Claims, 4 Drawing Sheets

(56) References Cited

U.S. PATENT DOCUMENTS

| | | | |
|---|---|---|---|
| 6,158,412 A | 12/2000 | Kim | |
| 6,371,092 B1 | 4/2002 | Guglielmo et al. | |
| 6,467,465 B1 | 10/2002 | Lorts | |
| 6,701,964 B1 | 3/2004 | Maurice | |
| 6,994,276 B2 | 2/2006 | Faye et al. | |
| 7,410,152 B2 | 8/2008 | Yates | |
| 8,005,603 B2 | 8/2011 | Fisher et al. | |
| 8,141,538 B2 | 3/2012 | Yang | |
| 8,839,821 B2 | 9/2014 | Pinkerton | |
| 8,939,129 B2 | 1/2015 | Prinz et al. | |
| 8,950,383 B2 | 2/2015 | Sperry | |
| 2002/0148451 A1 | 10/2002 | Yamamoto et al. | |
| 2002/0162323 A1* | 11/2002 | Detweiler | F01N 3/30 60/289 |
| 2010/0191005 A1* | 7/2010 | Andresen | B01F 3/02 549/518 |
| 2013/0341808 A1* | 12/2013 | Feldmann | F02M 9/08 261/64.1 |
| 2014/0034022 A1 | 2/2014 | Hu et al. | |
| 2014/0102422 A1* | 4/2014 | Prinz | F02M 21/047 123/527 |
| 2015/0061164 A1 | 3/2015 | Yates et al. | |

* cited by examiner

GASEOUS FUEL, EGR AND AIR MIXING DEVICE AND INSERT

BACKGROUND

The present invention relates to gaseous mixers for introducing gaseous fuel (i.e., fuel that naturally exists in a gaseous state, rather than a liquid state) and recirculated exhaust gas into an intake passage of an internal combustion engine, for example in a passenger vehicle or commercial vehicle. Gaseous fuels include natural gas (primarily methane) and derivatives thereof, such as butane and propane, but do not include gasoline.

Natural gas can be used to power internal combustion engines. Compared to conventional engines, vehicles run on natural gas are fuel-efficient and environmentally friendly. They are also able to provide good torque and robust performance, while outputting less engine noise than traditional diesel-powered engines. However, in order to meet the needs of a variety of different engines with varying displacement, performance, etc., a high number of specialized parts are required.

Modern natural gas engines employ Exhaust Gas Recirculation (EGR) to provide various performance benefits, including improved efficiency, increased torque, and reduced emissions compared to engines without EGR. The introduction and mixing of fuel and recirculated exhaust gas with intake air require separate devices.

SUMMARY

In one aspect, the invention provides a gaseous fuel mixing device of an air intake of an engine. A mixer body has an intake passage defined by an interior surface within the mixer body, and a gaseous fuel inlet for receiving gaseous fuel. A plurality of gaseous fuel diffusion apertures are in fluid communication with the gaseous fuel inlet for diffusing gaseous fuel into the intake passage. An insert is positioned within the intake passage. The insert includes a body defining a longitudinal axis between a leading end and a trailing end, and an exterior surface extending from the leading end to the trailing end. A body length extends from the leading end to the trailing end. A plurality of supports extend radially from the exterior surface of the body, each of the plurality of supports extending parallel to the longitudinal axis to divide an area between the exterior surface of the insert body and the interior surface of the mixer body into a plurality of separate longitudinally-extending intake passages. Each of the plurality of longitudinal intake passages has a radial height measured from the exterior surface of the insert body to the interior surface defining the intake passage, the radial height varying along the longitudinal axis. The exterior surface of the insert body is shaped to include a nose section in which the radial height varies from a maximum value at the leading end to a minimum value at a downstream end of the nose section, and a mixing section in which the exterior surface of the insert body is flat in longitudinal cross-section. The exterior surface of the insert body tapers down toward the longitudinal axis in a direction toward the trailing end such that the diameter of the insert body at the trailing end is at least 15 percent less than a maximum diameter of the insert body, which is at the position where the radial height is at the minimum value.

In another aspect, the invention provides an insert for a gaseous fuel mixing device of an air intake of an engine. A body defines a longitudinal axis, a leading end, a trailing end, and an exterior surface profile extending from the leading end to the trailing end. A plurality of supports extend radially from the body, each of the plurality of supports extending parallel to the longitudinal axis to divide an intake airflow along the body into a plurality of separate longitudinal intake passages. The exterior surface profile of the body includes a nose section in which a diameter of the exterior surface profile increases from a minimum value at the leading end to a maximum value at a downstream end of the nose section, the nose section being followed sequentially in a direction toward the trailing end by a flat section and a curved tapering section in which the exterior surface profile converges toward the longitudinal axis at an increasing rate from the flat section in a direction of the longitudinal axis toward the trailing end. The diameter of the body at the trailing end is at least 15 percent less than a maximum diameter of the insert body.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
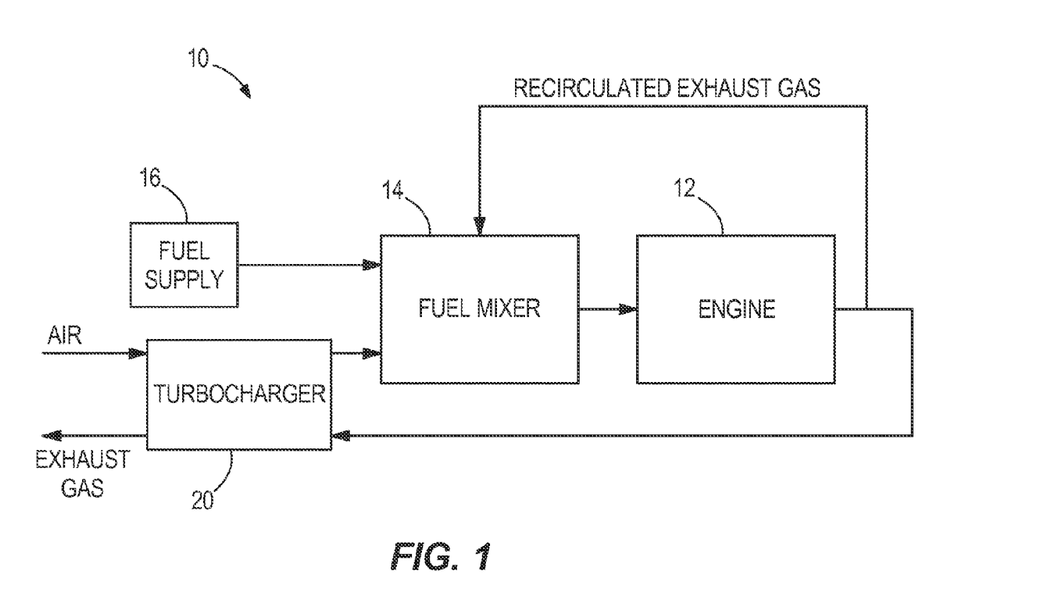
FIG. 1 is a schematic of an engine system including a mixing device according to the present invention.
Figure 2:
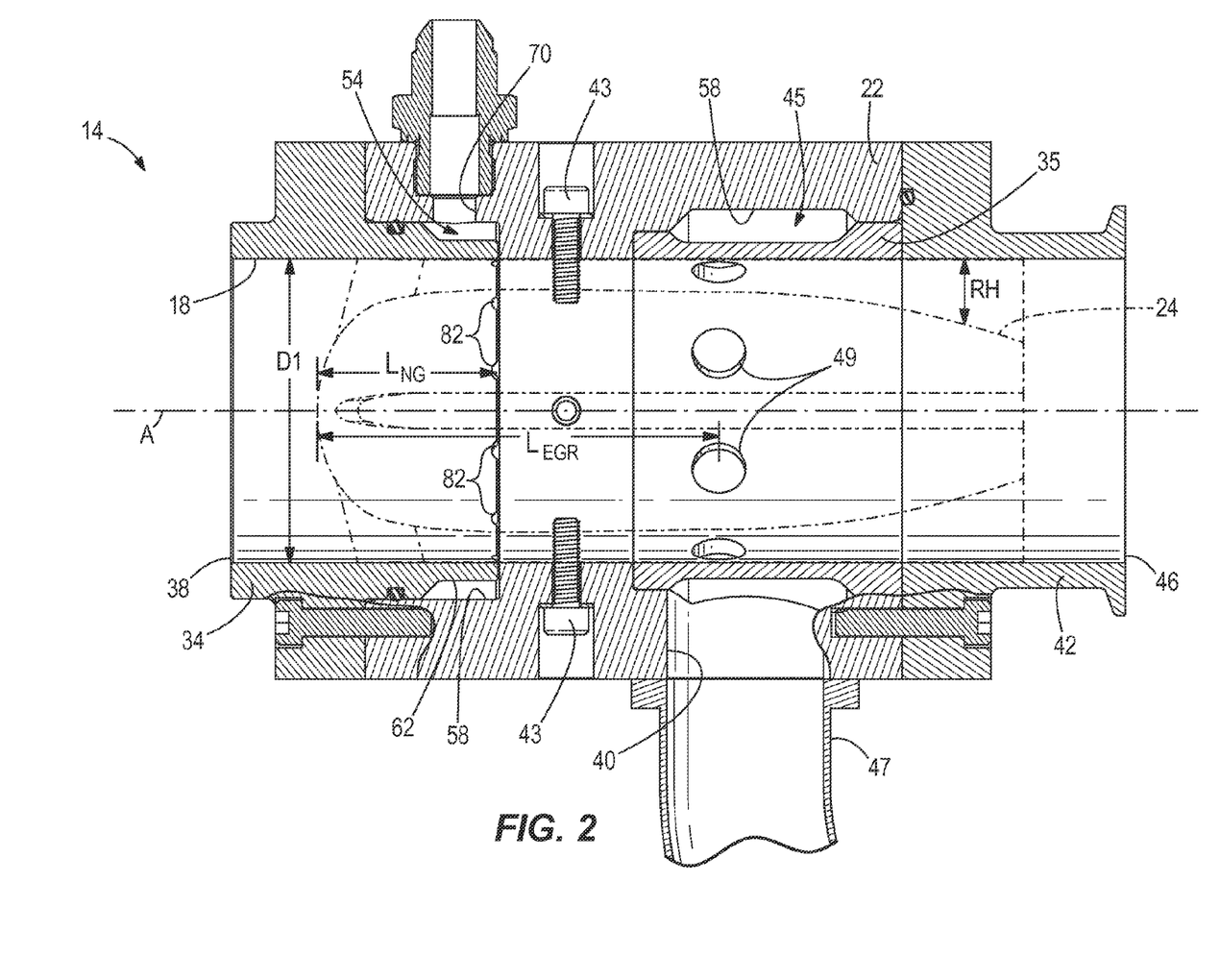
FIG. 2 a cross section view of a mixing device, with a removable insert shown in phantom.

FIG. 1 schematically illustrates an internal combustion engine system 10 operable on gaseous fuel. An internal combustion engine 12 (e.g., a turbocharged diesel engine configured for operation on gaseous fuel) includes a plurality of cylinders defining combustion chambers fed with a combustible intake charge from an intake pipe. As shown in FIG. 2 and discussed in further detail below, a gaseous fuel mixing device 14 (or "mixer") is located along an intake passage 18 to provide metered flow of gaseous fuel (e.g., compressed natural gas) from a fuel supply 16 into the intake airflow as it flows through the mixing device 14. The mixing device 14 includes a body 22 having a generally cylindrical opening that extends along a central axis A and that may be configured to accept a variety of interchangeable components. The intake airflow enters through an inlet 38 into the intake passage 18 defined by an interior surface (e.g., cylindrical or tubular surface). Gaseous fuel from one or more injectors (not shown) supplied by the fuel supply 16 inject gaseous fuel that is directed through one or more inlets 70 of the mixing device 14 to an annular channel 54 therein. From the annular channel 54, the gaseous fuel is directed radially inward through radial apertures 82 of a diffuser 34 where the gaseous fuel is mixed with the intake airflow and directed to the outlet 46 of the mixing device 14. The diffuser 34 is positioned within the body 22 along the intake passage 18 (see FIG. 2) and is configured to promote mixing of the intake airflow with the gaseous fuel (i.e., by distributing the gaseous fuel within the intake air). The diffuser 34 is sealed with at least one O-ring against the body 22. The diffuser 34 is radially enclosed by the body 22.

As illustrated, the diffuser 34 is formed as an inlet adapter, separate from the mixer body 22 and received by an upstream end thereof. The diffuser 34 mates to the upstream intake pipe, which may include a throttle body. The diffuser 34 forms the inlet 38 to the mixing device 14. However, other variations are contemplated, including a diffuser that is separate from the mixer body 22 and separate from an inlet adapter defining the inlet to the mixing device 14.

The diffuser 34 establishes an inlet diameter that is maintained throughout a plurality of components downstream of the diffuser 34 that combine to define the intake passage 18. The inlet 38 provided by the diffuser 34 may be sized corresponding to a diameter of a throttle body of the engine 12, so that the diameters match. The diffuser 34 also includes various temperature and pressure sensors (not shown) which communicate with electronic devices outside the mixing device 14 in order to assist in controlling the mixing device 14. An outlet adapter 42 is arranged downstream of the body 22 and provides a circularly shaped outlet 46 of the mixing device 14 through which the intake air flow is directed toward a combustion chamber of the engine 12 (e.g., via an intermediate intake manifold) after mixing with the gaseous fuel and/or recirculated exhaust gas. The diffuser 34 and the outlet adapter 42 are removably secured to first and second ends of the body 22 (i.e., by mounting screws) and may extend at least partially into the body 22 when secured to the body 22. The outlet adapter 42 is removably secured at the outlet 46 to an intake (e.g., pipe or manifold) of the engine 12 that leads into one or more combustion chambers. When removably secured to the body 22, an inner surface of the outlet adapter 42 may be flush with an inner surface of the body 22, the diffuser 34, and/or any additional components located within the body 22. In another construction, the features of the outlet adapter 42 are provided directly by the body 22 and no separate adapter is used.

The diffuser 34 and the outlet adapter 42 define, with the body 22 and an EGR diffuser 35 (discussed below), the intake passage 18 through the mixing device 14. The intake passage 18 extends axially from the inlet 38 to the outlet 46 and is configured to direct the intake airflow from the inlet 38 to the outlet 46. The intake passage 18 is radially defined by inner surfaces of the diffuser 34, the body 22, the EGR diffuser 35, and the outlet adapter 42 and is centered about the central axis A.

The diffuser 34 is arranged within the body 22 and is at least partially encircled by the body 22 along the intake passage 18. The diffuser 34, with the body 22, defines the annular channel 54 between a radially inner surface 58 of the body 22 and a radially outer surface 62 of the diffuser 34. The annular channel 54 is arranged along the center axis A at a fueling location along the center axis A where gaseous fuel is configured to be mixed with the intake airflow in the intake passage 18. The annular channel 54 at least partially encircles the intake passage 18. One or more gaseous fuel inlets 70 (e.g., three inlets 70) to the annular channel 54 are defined by the body 22 adjacent (e.g., directly radially outside) the annular channel 54. The inlets 70 to the annular channel 54 are circular apertures which extend radially relative to the center axis A from an exterior surface of the body 22 to the annular channel 54. Diffuser apertures 82 are defined by the diffuser 34 as half-circle shaped diffuser apertures arranged to allow flow generally perpendicular to the center axis A (i.e., radially inward). The diffuser apertures 82 are defined as cutouts or recesses in an axial end face at the downstream end of the diffuser 34, opposite the inlet 38, and are evenly spaced about a circumference of the downstream end face. The diffuser apertures 82 are bounded on the axially downstream end by abutting an inner shoulder surface of the body 22 that is arranged transverse to the center axis A. With this arrangement, the diffuser apertures 82 define the fueling location, which is positioned at a downstream end of the annular channel 54. However, the fueling location can be defined at other points along the annular channel 54, and the diffuser apertures 82 may be positioned within the diffuser 34, away from the downstream end face in other constructions. It is also noted that the diffuser apertures 82 may have other cross-sectional shapes other than the half-circle shape illustrated, for example, circular. The fueling location, which is discussed in further detail below, can be defined as the position along the central axis A of the center of the cross-section of the diffuser apertures 82, regardless of their particular shape.

In addition to the gaseous fuel inlet 70, an inlet 47 for exhaust gas recirculation (EGR), is provided so that the mixing device 14 is configured to diffuse a portion of the combustion gases exhausted from the engine 12 into the intake airflow. More particularly, the mixing device 14 may be provided with exhaust gas from the engine 12 through a bypass line upstream of the turbocharger 20 with the turbocharger 20 configured to compress the intake air in the intake passage 18, as shown in FIG. 1. This arrangement of the turbocharger 20 and the bypass line allows for high pressure EGR to enter the mixing device 14 via an EGR inlet 47. High pressure EGR is differentiated from low pressure EGR in that high pressure EGR feeds recirculated exhaust gas into an intake having air compressed by means of forced induction, rather than naturally aspirated. The EGR inlet 47 is coupled to an EGR inlet opening 40 in the body 22, which in turn feeds an annular channel 45 separate from and downstream of the annular channel 54 supplying gaseous fuel. The downstream annular channel 45 encircles at least a portion of the intake passage 18. Recirculated exhaust gas directed into the annular channel 45 is diffused into the intake airflow through an EGR diffuser 35.

The EGR diffuser 35 defines radial diffuser apertures 49 arranged generally perpendicular to the center axis A (see FIG. 2). The EGR diffuser 35 also defines a radially inner portion 62 of the downstream annular channel 45. The mixer body 22 defines a radially outer portion 58 of the downstream annular channel 45 and radially surrounds or encircles the downstream annular channel 45. Further, the EGR diffuser 35 is located at the same axial location as the EGR inlet opening 40 to receive exhaust gas flow directly therefrom in the radially inward direction. In other embodiments, not illustrated, the outlet adapter 42 and the EGR diffuser 35 are provided as a single, integrated component.

Although only shown in phantom in FIG. 2 for the clarity of illustrating the other portions of the mixing device 14, an insert 24 is positioned within the intake passage 18 between the upstream and downstream ends of the mixing device 14. The insert 24 is shown in further detail in FIGS. 3-6. A longitudinal axis Z of the insert 24 is coaxial with the center axis A of the intake passage 18 and the mixer body 22 when the insert 24 assembled in the mixing device 14. For example, the insert 24 can be secured to the mixer body 22 with a plurality of fasteners 43. The insert 24 can include a body 26 and a plurality of fins or supports 32 extending radially outward from an exterior surface of the insert body 26 toward the interior wall(s) defining the intake passage 18. The supports 32 may extend parallel to the longitudinal axis Z. In some constructions, the insert 24 is an aerodynamic blunt trailing edge insert in which the body 26 defines a surface profile adapted from the suction side of a blunt and divergent trailing edge airfoil. In the illustrated construction, the insert 24 includes four supports 32 arranged at 90 degree intervals about the longitudinal axis Z. One or more of the supports 32 has a radially outer edge including a threaded bore 33 for receiving the fastener 43 (e.g., mounting screw) that is inserted radially inward from the outside of the mixer body 22 through corresponding holes therein. The insert 24 overlaps with both diffusion locations along its longitudinal axis Z, for example extending upstream of the gaseous fuel diffuser apertures 82 and downstream of the EGR diffuser apertures 49. The insert 24 is configured to increase the velocity of the intake airflow in the intake passage 18 by narrowing the cross sectional area of the intake passage 18 transverse to the central axis A along the length of the insert 24. The increased velocity of the intake airflow creates a local pressure drop to assist the introduction of gaseous fuel and recirculated exhaust gas, thus minimizing the back pressure on the injectors and the exhaust system. Furthermore, the downstream expansion of the intake gases along and downstream of the insert 24 assists with the mixing of intake gases prior to entry into the intake manifold of the engine 12, which subsequently provides the charge into the engine cylinder(s), via valved intake port(s), for combustion.

Figure 5:
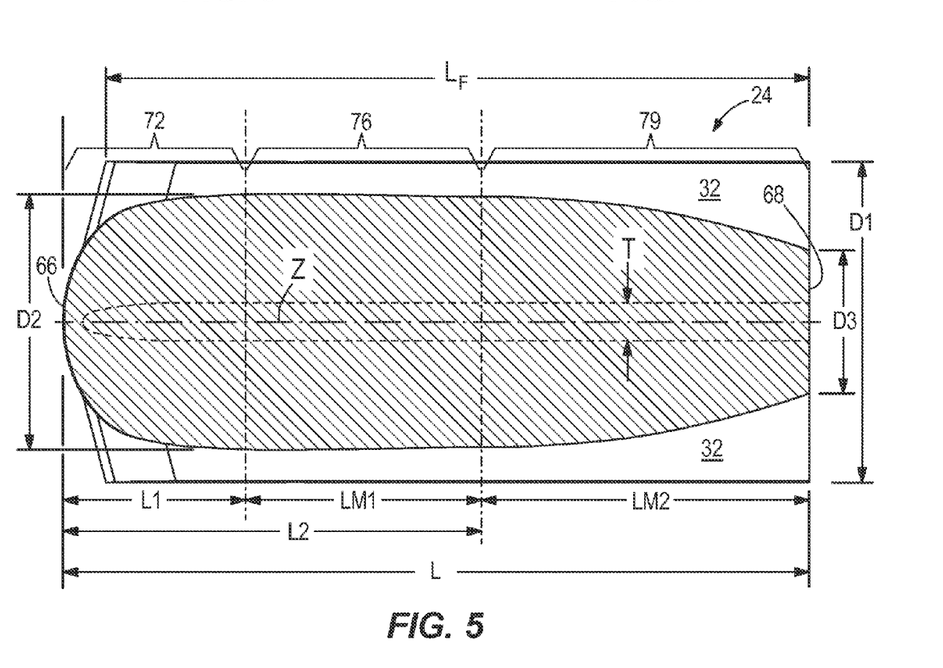
FIG. 5 is a cross-section view of the insert, taken along line 5-5 of FIG. 3.
Figure 6:
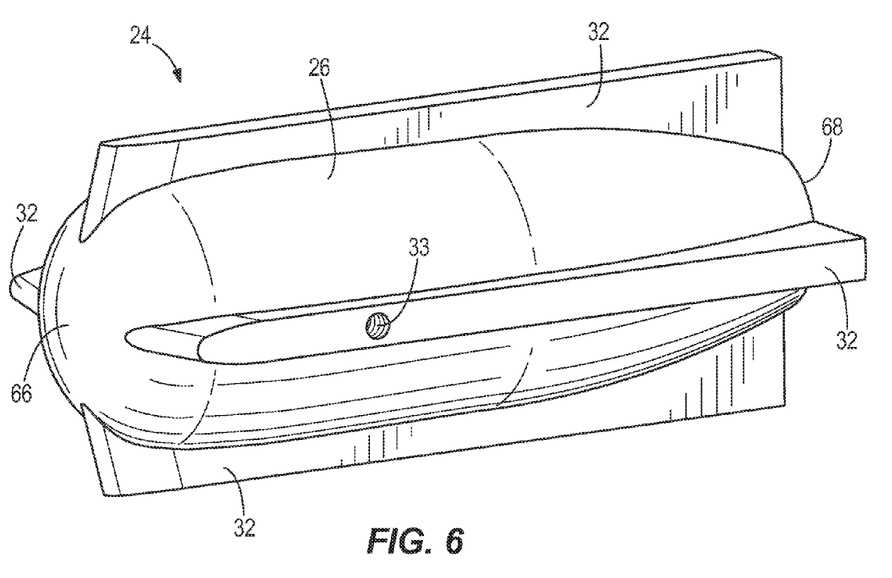
FIG. 6 is a perspective view of the insert.

The insert 24, and more particularly the insert body 26, defines a leading end 66 and trailing end 68 between which is measured a body length L (FIG. 5). An exterior surface 26A of the insert body 26 defines a profile in cross-section along and through the longitudinal axis Z. The profile of the exterior surface 26A is described in further detail, and is designed to provide beneficial mixing effects for the gaseous fuel and the recirculated exhaust gas diffused into the intake passage within the mixing device 14. The exterior surface 26A of the insert body 26 is shaped to include a nose section 72 extending from the leading end 66, and a mixing section 76 extending from the nose section 72. The mixing section 76 can be a first, front, or upstream mixing section in which the exterior surface 26A is flat in longitudinal cross-section. Although flat, the exterior surface 26A may have a slight angle (e.g., 3 degrees or less) with respect to the longitudinal axis Z. For example, the exterior surface 26A may define a straight taper (e.g., of 1 degree), becoming closer to the longitudinal axis Z in a direction toward the trailing end 68. Toward the trailing end 68 from the mixing section 76, the exterior surface 26A tapers down toward the longitudinal axis Z such that a diameter D3 of the insert body 26 at the trailing end 68 is at least 15 percent less than a maximum diameter D2 of the insert body 26. The tapered area downstream of the mixing section 76 may form a second, rear, or downstream mixing section 79 as explained in further detail below. The rear mixing section 79 may extend from the front mixing section 76 to the trailing end 68. The taper in the rear mixing section 79 can be a curved taper, and the rate of taper can increase in the direction approaching the trailing end 68.

The ratio of total insert length L to maximum body diameter D2 can be 2.93+/−1 in some constructions. Although scalable for a variety of applications, the total insert length L can be 158 mm. In some constructions, the rear mixing section 79 has a length LM2 that is longer than a length LM1 of the front mixing section 76 as measured along the longitudinal axis Z. In the length direction, the transition from the nose section 72 to the front mixing section 76 occurs at a length L1 from the leading end 66. Thus, the length L1 is the length of the nose section 72. The length L1 of the nose section 72 can be 22 percent to 32 percent (e.g., 27 percent) of the total insert length L. The transition from the front mixing section 76 to the rear mixing section 79 occurs at a length L2 from the leading end 66. Thus, the length LM1 of the front mixing section 76 is equal to L2 minus L1. The transition can be the point at which the profile of the exterior surface 26A changes from straight to curved. In some constructions, the length LM1 of the front mixing section 76 is 5 percent to 55 percent (e.g., 30 percent) of the total insert length L. The length L2 from the leading end 66 to the downstream end of the front mixing section 76 can be 37 percent to 77 percent (e.g., 57 percent) of the total insert length L.

Each of the supports 32 defines a length $L_F$ that is all or a majority of the length L of the insert 24. For example, the length $L_F$ of the supports 32 may be over 70 percent of the total length L, or over 90 percent. As illustrated, the supports 32 extend over more than 90 percent of the total insert length L and extend all the way to the trailing end 68. The length $L_F$ is taken as the distance parallel to the longitudinal axis Z along which the supports 32 maintain their maximum diameter D1, which extends to the interior surface defining the intake passage 18. Each of the supports 32 defines a consistent thickness T perpendicular to the longitudinal axis Z. The thickness T can be 18 percent of the maximum insert body diameter D2, plus or minus 10 percent. The thickness T is designed to work in conjunction with profile of the insert body 26 at the trailing end 68 to control the rejoining of the individual air streams in each of the intake passages 18A-18D back into a single air stream. The flow in all of the intake passages 18A-18D will converge to the center toward the longitudinal axis Z after the trailing end 68, but further convergence takes place between two adjacent intake passages 18A-18D separated by a common support 32. By balancing the support thickness T in relation to the trailing end diameter D3, the insert 24 can be designed to control flow separation vortices and decay to smooth flow for entering the engine 12.

Figure 3:
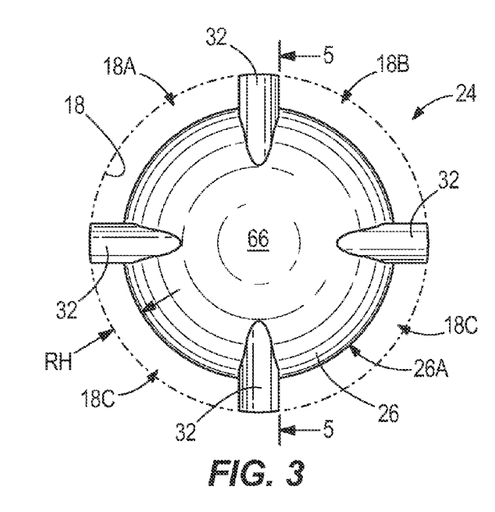
FIG. 3 is a leading end view of the insert.
Figure 4:
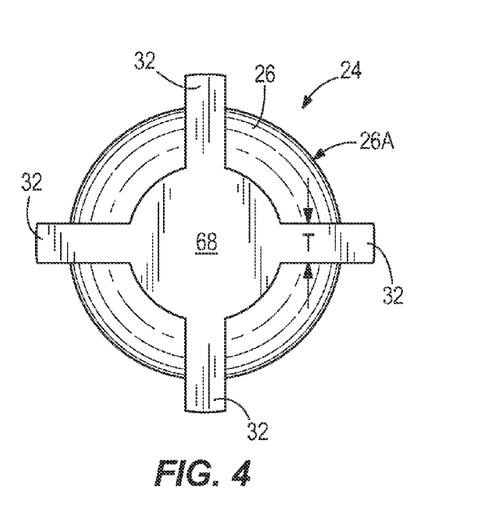
FIG. 4 is a trailing end view of the insert.

The radially outer ends of the supports 32 define an overall insert diameter D1 that exceeds the maximum body diameter D2. The overall insert diameter D1 generally matches that of the intake passage 18, although a minimal assembly clearance may be provided. The diameter D1 of the intake passage 18 and the insert 24 is at least 5 percent greater than the maximum diameter D2 of the insert body 26 and not more than 65 percent greater than the maximum diameter D2 of the insert body 26. The supports 32 divide the area between the exterior surface 26A of the insert body 26 and the interior of the mixing device 14 into a plurality of separate longitudinally-extending intake passages 18A-18D for channeling and straightening the intake airflow as the intake airflow proceeds in a direction toward an intake manifold, and eventually a combustion chamber, of the engine 12. Each of these parallel longitudinal intake passages 18A-18D has a radial height RH measured from the exterior surface 26A of the insert body 26 to the interior surface defining the intake passage 18 (i.e., to the radially outer ends of the supports 32), the radial height RH varying along the longitudinal axis Z. The radial height RH generally decreases from the leading end 66 to the front mixing section 76, stays constant or increases at a constant rate within the front mixing section 76, and increases throughout the rear mixing section 79 (e.g., at an increasing rate toward the trailing end 68). Thus, each of the intake passages 18A-18D converges toward the front mixing section 76 and diverges from the front mixing section 76, throughout the rear mixing section 79. It should be noted that the radial height RH is at a maximum at the leading end 66, and the radial height RH is at a minimum where the insert body 26 has its maximum diameter D2. The minimum value of radial height RH may be at the transition between the nose section 72 and the front mixing section 76, and may optionally be maintained throughout the front mixing section 76.

The extended straight profile of the exterior surface 26A of the insert body 26 within the front mixing section 76 allows the potential for introducing both gaseous fuel and recirculated exhaust gas into the intake airflow at relatively low pressure, high velocity areas within the mixing device 14 (as compared to the pressure and velocity just upstream of the insert 24). As mentioned above, the insert 24 is secured with respect to the mixer body 22, and this determines the introduction locations of the gaseous fuel and recirculated exhaust gas along the insert 24. The insert 24 is positioned within the mixer body 22 such that the diffuser apertures 82 for introducing gaseous fuel are positioned a length $L_{NG}$ away from and downstream of the leading end 66 as best illustrated in FIG. 2. The length $L_{NG}$ can be 24 percent to 34 percent (e.g., 29 percent) of the total insert length L. The EGR diffuser apertures 49 are located downstream of the gaseous fuel diffuser apertures 82, but not more than 80 percent of the total insert length L away from the leading end 66 of the insert body 26 (e.g., 60 percent of the total insert length L). The length between the leading end 66 and the EGR diffuser apertures 49 is defined as $L_{EGR}$ as shown in FIG. 2. In some constructions, the length $L_{EGR}$ from the leading end 66 to the EGR diffuser apertures 49 is as little as 40 percent of the total insert length L. In some constructions, the gaseous fuel diffusion location is at the upstream end of the front mixing section 76 (e.g., within the first 20 percent of front mixing section length LM1) and the EGR diffusion location is at the upstream end of the rear mixing section 79 (e.g., within the first 20 percent of rear mixing section length LM2). However, the ranges of variation allow alternate relationships. For example, the gaseous fuel diffuser apertures 82 may be positioned further downstream in the front mixing section 76, or upstream of the front mixing section 76. Furthermore, the EGR diffuser apertures 49 may be located further downstream in the rear mixing section 79, or upstream of the rear mixing section 79 within the front mixing section 76. In some constructions, the main gaseous fuel for the intake charge may be provided at a location downstream of a location of EGR introduction. For example, the locations of the gaseous fuel diffuser apertures 82 and the EGR diffuser apertures 49 can be reversed, while otherwise conforming to the above description. In any of the embodiments illustrated herein or discussed above, it is also considered to mix only one diffused substance with the air. For example, even when a mixing device is provided with diffusers for both gaseous fuel and EGR, one or the other may be shut off for a given period of time (e.g., by a signal from a controller to a shut off valve). In other constructions, the mixing device may only include a single diffuser, and only a single diffused substance is mixed with the air.

In operation, the intake air is provided into the mixing device 14 through the inlet 38. Meanwhile, gaseous fuel is provided from the gaseous fuel supply 16 to the inlet 70. The gaseous fuel is directed into the first annular channel 54 and through the diffuser apertures 82 to create jets that penetrate and mix with the channeled intake airflow. As mentioned above, the diffuser apertures 82 are positioned relative to the insert 24 such that the introduction of gaseous fuel is aided by the high velocity and low pressure of the intake airflow as it is forced to flow around the nose section 72 into the front mixing section 76. Further downstream, exhaust gas from the engine 12 is delivered to the EGR inlet opening 40 through the EGR supply pipe 47 for recirculation. The exhaust gas for recirculation is directed through the second annular channel 45 and through the apertures 49 in the EGR diffuser 35. Due to the relative orientation between the EGR diffuser 35 and the insert 24, the intake airflow is still at relatively high velocity and low pressure at the location of the apertures 49. Thus, backpressure is reduced in the EGR line from the engine exhaust side. The substantial spacing distance from the EGR diffuser apertures 49 to the trailing end 68 ensures ample mixing time for the EGR into the intake airflow along with the gaseous fuel for high quality, predictable combustion within the engine 12.

As mentioned above, the exterior surface 26A of the insert body 26 may taper within the rear mixing section 79 such that the trailing end diameter D3 is at least 15 percent less than the maximum insert body diameter D2, up to 75 percent less than the maximum insert body diameter D2. In some constructions, the trailing end diameter D3 is at least 30 percent less than the maximum insert body diameter D2. In some constructions, the trailing end diameter D3 is at least 45 percent less than the maximum insert body diameter D2. In the illustrated construction, the trailing end diameter D3 is 55 percent of the maximum insert body diameter D2. The reduction of the insert body diameter toward the trailing end 68 reduces the strength of the separating vortices at the trailing edge 68, but too great of a reduction will lead to flow separation prior to the trailing end 68, and a corresponding loss of performance.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention.

What is claimed is:

1. A gaseous fuel mixing device of an air intake of an engine, the gaseous fuel mixing device comprising:
    a mixer body, wherein an intake passage is defined by an interior surface within the mixer body, the mixer body including a gaseous fuel inlet for receiving gaseous fuel;
    a plurality of gaseous fuel diffusion apertures in fluid communication with the gaseous fuel inlet for diffusing gaseous fuel into the intake passage; and
    an insert positioned within the intake passage, the insert including
        a body defining a longitudinal axis between a leading end and a trailing end, and an exterior surface extending from the leading end to the trailing end, a body length extending from the leading end to the trailing end, and
        a plurality of supports extending radially from the exterior surface of the body to the interior surface defining the intake passage, each of the plurality of supports extending parallel to the longitudinal axis to divide an area between the exterior surface of the insert body and the interior surface within the mixer body into a plurality of separate longitudinally-extending intake passages,
    wherein each of the plurality of longitudinal intake passages has a radial height measured from the exterior surface of the insert body to the interior surface defining the intake passage, the radial height varying along the longitudinal axis, wherein the exterior surface of the insert body is shaped to include a nose section in which the radial height varies from a maximum value at the leading end to a minimum value at a downstream end of the nose section, and a mixing section in which the exterior surface of the insert body is flat in longitudinal cross-section, and wherein the exterior surface of the insert body tapers down toward the longitudinal axis in a direction toward the trailing end such that the diameter of the insert body at the trailing end is at least 15 percent less than a maximum diameter of the insert body, which is at the position where the radial height is at the minimum value.

2. The gaseous fuel mixing device of claim 1, further comprising a plurality of exhaust gas recirculation diffusion apertures in fluid communication with an exhaust of the engine for diffusing a portion of the exhaust from the engine into the intake passage downstream of the plurality of gaseous fuel diffusion apertures, but not more than 80 percent of the body length away from the leading end of the insert body.

3. The gaseous fuel mixing device of claim 1, wherein the mixing section is a front mixing section and the exterior surface of the body further defines a rear mixing section extending from a downstream end of the front mixing section to the trailing end, the radial height continually increasing throughout the rear mixing section to the trailing end.

4. The gaseous fuel mixing device of claim 3, wherein the rear mixing section is longer than the front mixing section as measured along the longitudinal axis.

5. The gaseous fuel mixing device of claim 3, further comprising a plurality of exhaust gas recirculation diffusion apertures in fluid communication with an exhaust of the engine for diffusing a portion of the exhaust from the engine into the intake passage downstream of the plurality of gaseous fuel diffusion apertures, wherein the plurality of gaseous fuel diffusion apertures open into the front mixing section, and the plurality of exhaust gas recirculation diffusion apertures open into the rear mixing section.

6. The gaseous fuel mixing device of claim 1, wherein the plurality of supports extend to the trailing end of the insert body.

7. The gaseous fuel mixing device of claim 1, wherein the diameter of the insert body at the trailing end is at least 30 percent smaller than the maximum diameter of the insert body.

8. The gaseous fuel mixing device of claim 7, wherein the diameter of insert body at the trailing end is at least 45 percent smaller than the maximum diameter of the insert body.

9. The gaseous fuel mixing device of claim 3, wherein the exterior surface of the insert body has an angle of 3 degrees or less with the longitudinal axis within the front mixing section, and the exterior surface of the insert body within the rear mixing section converges toward the longitudinal axis at an increasing rate toward the trailing end.

10. The gaseous fuel mixing device of claim 1, wherein at least one of the plurality of supports has a radially outer end secured with the interior surface defining the intake passage such that the longitudinal axis of the insert body is coaxial with a central axis of the intake passage.

11. The gaseous fuel mixing device of claim 1, wherein a diameter of the intake passage is at least 5 percent greater than the maximum diameter of the insert body and not more than 65 percent greater than the maximum diameter of the insert body.

12. The gaseous fuel mixing device of claim 1, wherein the plurality of gaseous fuel diffusion apertures is positioned at least 24 percent of the body length away from the leading end, but not more than 34 percent of the body length away from the leading end, and wherein the plurality of exhaust gas recirculation diffusion apertures is positioned at least 40 percent of the body length away from the leading end, but not more than 80 percent of the body length away from the leading end.

13. An insert for a gaseous fuel mixing device of an air intake of an engine, the insert comprising:
a body defining a longitudinal axis, a leading end, a trailing end, and an exterior surface profile extending from the leading end to the trailing end; and
a plurality of supports extending radially from the body, each of the plurality of supports extending parallel to the longitudinal axis to divide an intake airflow along the body into a plurality of separate longitudinal intake passages;
wherein the exterior surface profile of the body includes a nose section in which a diameter of the exterior surface profile increases from a minimum value at the leading end to a maximum value at a downstream end of the nose section, the nose section being followed sequentially in a direction toward the trailing end by a flat section and a curved tapering section in which the exterior surface profile converges toward the longitudinal axis at an increasing rate from the flat section in a direction of the longitudinal axis toward the trailing end, and
wherein the diameter of the body at the trailing end is at least 15 percent less than a maximum diameter of the body, but not more than 75 percent less than the maximum diameter of the body such that the trailing end forms a blunt trailing end that does not taper to a point.

14. The insert of claim 13, wherein the trailing end diameter is at least 30 percent smaller than the maximum diameter defined by the body.

15. The insert of claim 13, wherein the trailing end diameter is 40 percent smaller than the maximum diameter defined by the body.

16. The insert of claim 13, wherein the plurality of supports extend to the trailing end of the body.

17. The insert of claim 13, wherein each of the plurality of supports has a radially outer edge, the radially outer edges defining a diameter at least 5 percent greater than the maximum diameter of the body and not more than 65 percent greater than the maximum diameter of the body.

18. The insert of claim 13, wherein the flat section has an angle of 3 degrees or less with the longitudinal axis.

19. The insert of claim 13, wherein the curved tapering section is longer than the flat section as measured along the longitudinal axis.

* * * * *